(12) United States Patent
Kim et al.

(10) Patent No.: US 10,904,651 B2
(45) Date of Patent: Jan. 26, 2021

(54) DISPLAY APPARATUS

(71) Applicant: LG Display Co., Ltd., Seoul (KR)

(72) Inventors: Kwangho Kim, Bucheon-si (KR);
YeongRak Choi, Bucheon-si (KR);
Sungtae Lee, Bucheon-si (KR); Sungsu Ham, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 73 days.

(21) Appl. No.: 16/043,599

(22) Filed: Jul. 24, 2018

(65) Prior Publication Data
US 2019/0045286 A1  Feb. 7, 2019

(30) Foreign Application Priority Data

Aug. 4, 2017  (KR) .......................... 10-2017-0099182

(51) Int. Cl.
*H04R 25/00* (2006.01)
*H03G 3/00* (2006.01)
(Continued)

(52) U.S. Cl.
CPC ............ *H04R 1/028* (2013.01); *H04R 1/021* (2013.01); *H04R 1/288* (2013.01); *H04R 7/045* (2013.01); *H04R 17/00* (2013.01); *G02F 1/1368* (2013.01); *G02F 1/136286* (2013.01); *G02F 2001/136222* (2013.01); *H04R 9/025* (2013.01); *H04R 2499/15* (2013.01)

(58) Field of Classification Search
CPC ............ G02F 1/136286; G02F 1/1368; G02F 2001/136222; H04R 17/00; H04R 1/021; H04R 1/025; H04R 1/028; H04R 1/288; H04R 2499/15; H04R 7/045; H04R 7/04; H04R 9/025; H04R 9/045; H04R 9/06; H04R 9/063; H04R 2201/029; H04R 2400/03; H04R 2440/07
USPC ......... 381/62, 152, 162, 164, 191, 403, 405, 381/407
See application file for complete search history.

(56) References Cited

U.S. PATENT DOCUMENTS

| | | | | |
|---|---|---|---|---|
| 4,384,252 A | * | 5/1983 | Kolter | .................... G01P 3/488 324/207.16 |
| 4,891,842 A | * | 1/1990 | Green | .................... H04R 1/025 181/150 |

(Continued)

FOREIGN PATENT DOCUMENTS

| | | |
|---|---|---|
| CN | 105096778 A | 11/2015 |
| EP | 3396972 A1 | 10/2018 |

(Continued)

OTHER PUBLICATIONS

Office Action from the China National Intellectual Property Administration dated Mar. 25, 2020 in a corresponding Chinese patent application No. 201810834258.X.

*Primary Examiner* — Khai N. Nguyen
(74) *Attorney, Agent, or Firm* — Morgan, Lewis & Bockius LLP

(57) ABSTRACT

A display apparatus is disclosed. The display apparatus includes a display panel configured to display an image and a supporting member at a rear surface of the display panel. The display apparatus also includes a sound generator between the display panel and the supporting member, and at least one vibration member between the display panel and the supporting member.

16 Claims, 8 Drawing Sheets

(51) Int. Cl.
  *H04R 1/02* (2006.01)
  *H04R 17/00* (2006.01)
  *H04R 1/28* (2006.01)
  *H04R 7/04* (2006.01)
  *G02F 1/1362* (2006.01)
  *G02F 1/1368* (2006.01)
  *H04R 9/02* (2006.01)

(56) References Cited

U.S. PATENT DOCUMENTS

| | | | | |
|---|---|---|---|---|
| 5,025,474 A * | 6/1991 | Tanaka | | G03B 21/565 |
| | | | | 181/148 |
| 8,773,373 B2 | 7/2014 | Sato et al. | | |
| 9,127,112 B2 * | 9/2015 | Kosaka | | C08F 297/08 |
| 9,436,320 B2 * | 9/2016 | Kang | | H04R 17/005 |
| 9,813,822 B2 * | 11/2017 | Wang | | H04R 17/005 |
| 9,818,805 B2 * | 11/2017 | Choi | | G06F 1/1637 |
| 10,009,683 B2 * | 6/2018 | Choi | | H04R 1/323 |
| 10,129,646 B2 * | 11/2018 | Choi | | H04R 7/045 |
| 10,142,738 B2 * | 11/2018 | Choi | | H04N 5/642 |
| 10,142,739 B2 * | 11/2018 | Choi | | H04R 1/028 |
| 10,200,772 B2 | 2/2019 | Ahn et al. | | |
| 10,219,079 B2 * | 2/2019 | Choi | | H04R 1/028 |
| 10,237,656 B2 * | 3/2019 | Lee | | H04R 1/26 |
| 10,365,685 B2 * | 7/2019 | Lee | | G06F 1/1605 |
| 10,469,928 B2 * | 11/2019 | Kim | | H04R 7/045 |
| 10,555,073 B2 * | 2/2020 | Choi | | G02F 1/1333 |
| 10,567,880 B2 * | 2/2020 | Ham | | H04R 1/025 |
| 10,571,958 B2 * | 2/2020 | Lee | | H05K 5/0017 |
| 10,582,282 B2 * | 3/2020 | Kim | | H04R 7/04 |
| 10,595,121 B2 * | 3/2020 | Ham | | H04R 1/025 |
| 2003/0003879 A1 * | 1/2003 | Saiki | | H04M 1/03 |
| | | | | 455/575.1 |
| 2005/0254682 A1 * | 11/2005 | Maekawa | | H04R 9/043 |
| | | | | 381/404 |
| 2006/0009251 A1 * | 1/2006 | Noda | | H01Q 1/22 |
| | | | | 455/550.1 |
| 2006/0158845 A1 * | 7/2006 | Kim | | G06F 1/1601 |
| | | | | 361/679.46 |
| 2007/0071259 A1 * | 3/2007 | Tojo | | G06F 1/1605 |
| | | | | 381/152 |
| 2007/0132911 A1 * | 6/2007 | fujiwara | | H04M 1/035 |
| | | | | 349/58 |
| 2009/0034759 A1 * | 2/2009 | Ko | | H04N 5/642 |
| | | | | 381/152 |
| 2010/0303278 A1 * | 12/2010 | Sahyoun | | H04R 9/043 |
| | | | | 381/398 |
| 2011/0141046 A1 | 6/2011 | Sato et al. | | |
| 2012/0243719 A1 * | 9/2012 | Franklin | | G06F 1/1652 |
| | | | | 381/333 |
| 2012/0326831 A1 * | 12/2012 | Suzuki | | H01F 27/263 |
| | | | | 336/233 |
| 2014/0213728 A1 * | 7/2014 | Kosaka | | C08F 297/08 |
| | | | | 525/97 |
| 2015/0078604 A1 * | 3/2015 | Seo | | G06F 1/1635 |
| | | | | 381/333 |
| 2015/0341714 A1 * | 11/2015 | Ahn | | H04M 1/03 |
| | | | | 381/333 |
| 2016/0353208 A1 * | 12/2016 | Matsuoka | | H04R 17/005 |
| 2017/0055353 A1 * | 2/2017 | Park | | H05K 1/0215 |
| 2017/0105294 A1 * | 4/2017 | Shimoda | | H04M 1/02 |
| 2017/0280234 A1 * | 9/2017 | Choi | | G02F 1/1333 |
| 2017/0280246 A1 * | 9/2017 | Choi | | H04R 9/066 |
| 2017/0280249 A1 * | 9/2017 | Choi | | H04R 1/028 |
| 2017/0287990 A1 * | 10/2017 | Choi | | G06F 1/1637 |
| 2017/0289694 A1 * | 10/2017 | Choi | | G06F 1/1605 |
| 2018/0035208 A1 * | 2/2018 | Choi | | G06F 3/167 |
| 2018/0288202 A1 * | 10/2018 | Park | | H04M 1/026 |
| 2018/0317011 A1 * | 11/2018 | Choi | | H04R 1/025 |
| 2019/0045286 A1 * | 2/2019 | Kim | | H04R 1/028 |

FOREIGN PATENT DOCUMENTS

| | | |
|---|---|---|
| JP | 3183760 U | 5/2013 |
| JP | 2014160914 A | 9/2014 |
| WO | 2009147741 A1 | 12/2009 |

* cited by examiner

US 10,904,651 B2

DISPLAY APPARATUS

CROSS-REFERENCE TO RELATED APPLICATIONS

This application claims the priority of the Korean Application No. 10-2017-0099182, filed on Aug. 4, 2017, the entirety of which is hereby incorporated by reference.

BACKGROUND

1. Technical Field

The present disclosure relates to a display apparatus including a sound generator.

2. Discussion of the Related Art

With the advancement of an information-oriented society, various requirements for display products for expressing information in accordance with an electric information signal are increasing. Thus, research is being conducted on various display apparatuses that are thin, light, and have low power consumption.

For example, a display apparatus may be categorized into a liquid crystal display (LCD) apparatus, field emission display (FED) apparatus, organic light emitting display apparatus, light emitting diode display apparatus, quantum dot light emitting display apparatus, etc.

Among the above types of display apparatuses, the LCD apparatus may include an array substrate including a thin film transistor (TFT), an upper substrate including a color filter and/or a black matrix, and a liquid crystal layer interposed between the array substrate and the upper substrate. An alignment state of the liquid crystal layer is controlled based on an electric field applied across two electrodes in a pixel area, whereby light transmittance is adjusted based on the alignment state of the liquid crystal layer to display an image.

The organic light emitting display apparatus is a self-emitting display apparatus. It is attracting much attention due to its fast response speed, high light-emitting efficiency, excellent luminance, and a wide viewing angle in comparison with other available display apparatuses.

Display apparatuses may each include a display panel for displaying an image and a sound device for outputting a sound associated with the image.

However, in display apparatuses, sound generated in the sound device advances toward a lower or rear portion of the display panel. In this arrangement, sound quality may deteriorate, for example, due to an interference with sound reflecting on the wall and floor. Thus, it is difficult to deliver the sound output from the sound device clearly to a user without disrupting his or her immersion experience.

Moreover, if a speaker is added to a display apparatus, a thickness of the display apparatus increases.

SUMMARY

Accordingly, the present disclosure is directed to a display apparatus that substantially obviates one or more of the issues due to limitations and disadvantages of the related art.

Therefore, the inventors have recognized the above-described problems and have performed various experiments for developing a sound generator which is miniaturized for incorporation in display apparatuses and outputs enhanced sound. Through the various experiments, the inventors have developed a display apparatus having a new structure, which includes a sound generator that enhances the quality of output sound and is capable of being miniaturized, for example, for incorporation in display apparatuses of varying sizes and shapes.

An aspect of the present disclosure is to provide a display apparatus including a sound generator which enhances sound quality and is capable of being miniaturized.

Additional features and aspects will be set forth in the description that follows, and in part will be apparent or may be learned by practice of inventive concepts provided herein. Other features and aspects of the inventive concepts may be realized and attained by the structure particularly pointed out in the written description, or derivable therefrom, and the claims hereof, as well as the appended drawings.

To achieve these features and aspects of the inventive concepts, as embodied and broadly described, a display apparatus comprises: a display panel configured to display an image; a supporting member at a rear surface of the display panel; a sound generator between the display panel and the supporting member; and at least one vibration member between the display panel and the supporting member.

The at least one vibration member may comprise a vibration transfer member between the display panel and the sound generator.

The vibration transfer member may be configured to transfer a vibration having a high-pitched sound band of the sound generator to the display panel to generate sound.

The vibration transfer member may be at a center of the sound generator.

The display apparatus may further comprise an adhesive member attaching the vibration transfer member to one or both of the sound generator and the display panel.

The at least one vibration member may comprise a vibration generation member between the display panel and the sound generator.

The vibration generation member may be configured to vibrate the display panel to generate sound having a low-pitched sound band of the sound generator.

The vibration generation member may be in a periphery of the display panel.

The display apparatus may further comprise an adhesive member attaching the vibration generation member to one or both of the sound generator and the display panel.

The at least one vibration member may comprise a vibration transfer member between the display panel and the sound generator; and a vibration generation member on a surface of the supporting member facing the display panel.

The vibration transfer member may be at a center of the display panel, and the vibration generation member may be in a periphery of the display panel.

The vibration transfer member may be configured to transfer a vibration having a high-pitched sound band of the sound generator to the display panel, and the vibration generation member may be configured to generate sound having a low-pitched sound band of the sound generator.

The sound generator may be configured to vibrate the display panel via the at least one vibration member to generate sound.

The sound generator may comprise a piezoelectric sound generator.

In another aspect, a display apparatus comprises: a display panel configured to display an image; a supporting member and a sound generator at a rear surface of the display panel; at least one vibration generation member between the display panel and the supporting member; and at least one vibration transfer member between the display panel and the sound generator.

The at least one vibration generation member may be between the display panel and the sound generator, and in a periphery of the sound generator.

The at least one vibration generation member may be between the supporting member and the sound generator, and in a periphery of the sound generator.

The at least one vibration transfer member may be at a center of the sound generator.

The at least one vibration generation member may be configured to generate sound having a low-pitched sound band of the sound generator.

The at least one vibration transfer member may be configured to transfer a vibration having a high-pitched sound band of the sound generator to the display panel to generate sound.

The sound generator may comprise a piezoelectric sound generator. The sound generator may be configured to vibrate the display panel via the at least one vibration generation member or the at least one vibration transfer member to generate sound.

In yet another aspect, a display apparatus comprises: a display panel configured to display an image; a supporting member at a rear surface of the display panel; a sound generator between the display panel and the supporting member; at least one vibration transfer member between the display panel and the sound generator; and at least one vibration generation member on a surface of the supporting member facing the display panel, the at least one vibration generation member including a material different from a material of the at least one vibration transfer member.

The at least one vibration transfer member may comprise one of metal, plastic, and a carbon fiber, and the at least one vibration generation member comprises a rubber-based material or a cushion material.

The at least one vibration transfer member may be at a center of the sound generator, and the at least one vibration generation member may be in a periphery of the sound generator.

The at least one vibration transfer member may be configured to transfer a vibration having a high-pitched sound band of the sound generator to the display panel to generate sound having the high-pitched sound band, and the at least one vibration generation member may be configured to generate sound having a low-pitched sound band of the sound generator.

The sound generator may comprise a piezoelectric sound generator. The sound generator may be configured to vibrate the display panel via the at least one vibration generation member or the at least one vibration transfer member to generate sound.

Other systems, methods, features, and advantages will be, or will become, apparent to one with skill in the art upon examination of the following figures and detailed description. It is intended that all such additional systems, methods, features, and advantages be included within this description, be within the scope of the present disclosure, and be protected by the following claims. Nothing in this section should be taken as a limitation on those claims. Further aspects and advantages are discussed below in conjunction with example embodiments of the disclosure.

It is to be understood that both the foregoing general description and the following detailed description of the present disclosure are exemplary and explanatory, and are intended to provide further explanation of the disclosure as claimed.

BRIEF DESCRIPTION OF THE DRAWINGS

The accompanying drawings, that are included, for example, to provide a further understanding of the disclosure and are incorporated in and constitute a part of this specification, illustrate embodiments of the disclosure and together with the description serve to explain various principles.

DETAILED DESCRIPTION

Figure 1:
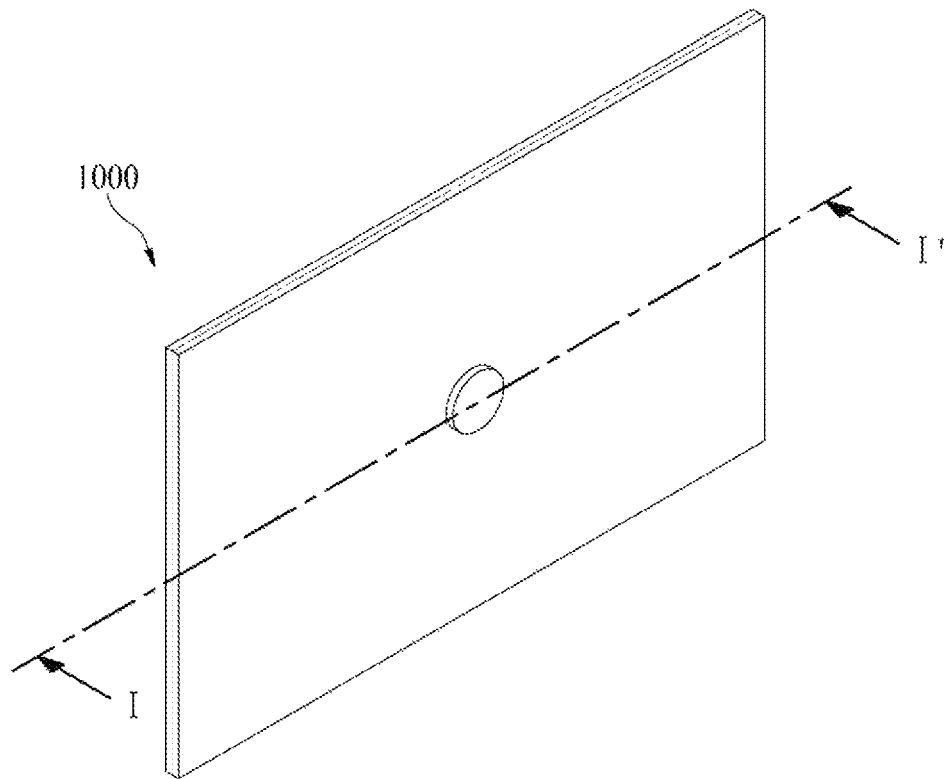
FIG. 1 illustrates a display apparatus according to an example embodiment of the present disclosure.

Reference will now be made in detail to embodiments of the present disclosure, examples of which may be illustrated in the accompanying drawings.

The progression of processing steps and/or operations described is an example; however, the sequence of steps and/or operations is not limited to that set forth herein and may be changed as is known in the art or as apparent to those skilled in the art, with the exception of steps and/or operations necessarily occurring in a particular order. Like reference numerals designate like elements throughout. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc., may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" encompasses the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

In the present disclosure, the term "display apparatus" may broadly include a display apparatus, such as an organic light emitting display (OLED) module or a liquid crystal module (LCM), including a display panel and a driver for driving the display panel. Further, the term "display apparatus" may also broadly include a set device (or a set apparatus) or a set electronic device such as a notebook computer, a TV, a computer monitor, an automotive display or another type of equipment display including for vehicles, or a mobile electronic device such as a smart phone or electronic pad, etc., which is a complete product (or a final product) including an LCM or an OLED module, or the like.

Accordingly, in the present disclosure, the term "display apparatus" may include a display apparatus itself, such as an LCM or an OLED module, as well as a set apparatus that is a final consumer device or an application product including the LCM or the OLED module.

Moreover, in some examples, the LCM or the OLED module, including a display panel and a driver, may be referred to as a "display apparatus," and an electronic apparatus as a final product including an LCM or an OLED module may be referred to as a "set apparatus." For example, the display apparatus may include a display panel, such as an LCD or an OLED, and a source printed circuit board (PCB) which is a controller for driving the display panel. The set apparatus may further include a set PCB which is a controller electrically connected to the source PCB to overall operations of the set device or the set apparatus.

A display panel used for an embodiment of the present disclosure may be any type of display panel, including, for example without limitation, a liquid crystal display panel, an organic light emitting diode (OLED) display panel, an electroluminescent display panel, etc. For example, the display panel may be any panel capable of generating sound in accordance with a vibration by a sound generation device. The display panel according to an embodiment of the present disclosure is not limited in its shape or size.

An example liquid crystal display panel may include a plurality of gate lines, a plurality of data lines, and a plurality of pixels respectively provided in a plurality of pixel areas defined by intersections of the gate lines and the data lines. The liquid crystal display panel may include an array substrate including a thin film transistor (TFT) corresponding to a switching device for controlling a light transmittance of each of the plurality of pixels, an upper substrate including a color filter and/or black matrix, and a liquid crystal layer formed between the array substrate and the upper substrate.

An example organic light emitting display panel may include a plurality of gate lines, a plurality of data lines, and a plurality of pixels respectively provided in a plurality of intersections of the gate lines and the data lines. The organic light emitting display panel may include an array substrate including a thin film transistor (TFT) corresponding to an element for selectively applying a voltage to each pixel, an organic light emitting device layer on the array substrate, and an encapsulation substrate disposed on the array substrate to cover the organic light emitting device layer. The encapsulation substrate may protect the TFT and the organic light emitting device layer from an external impact, and may reduce or prevent moisture or oxygen from penetrating into the organic light emitting device layer. The organic light emitting device layer provided on the array substrate may be changed to an inorganic light emitting layer, for example, a nano-sized material layer or the like.

The display panel may further include a backing, such as a metal plate attached to a display panel, but embodiments are not limited to the metal plate. An alternative structure, for example, formed of a different material, may be provided.

The display panel including the sound generation device according to an embodiment of the present disclosure may be implemented at a user interface module in a vehicle, such as a central control panel in an automobile. For example, such a display panel may be configured between two front occupants such that sounds due to vibrations of the display panel propagate towards the interior cabin of a vehicle. As such, the audio experience in a vehicle can be improved in comparison with having speakers only at the interior sides or edges of the vehicle.

Hereinafter, a display apparatus according to example embodiments of the present disclosure will be described in detail with reference to the accompanying drawings.

Figure 2A:
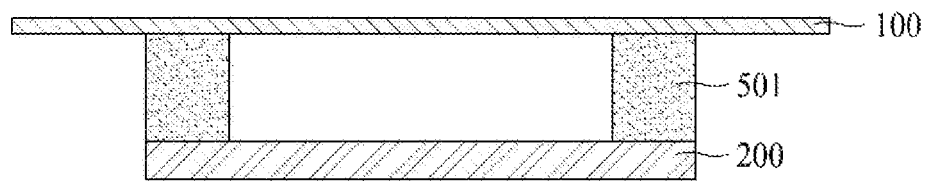
FIG. 2A is a cross-sectional view taken along line I-I' of FIG. 1 and illustrates a display apparatus according to a first embodiment of the present disclosure.
Figure 2A:
Figure 2B:
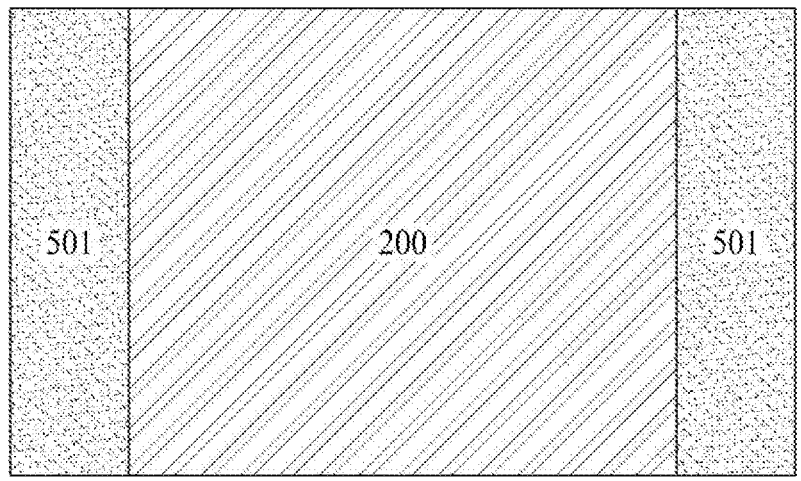
FIG. 2B illustrates a top view according to a first example embodiment of the present disclosure.
Figure 2C:
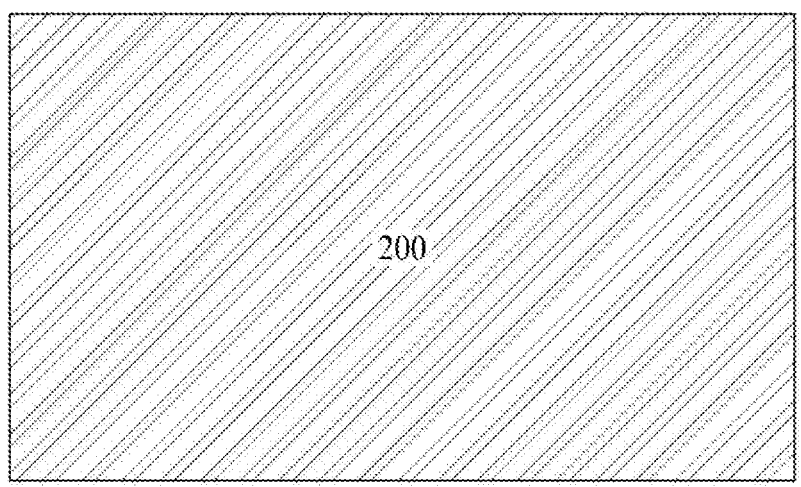
FIG. 2C illustrates a bottom view according to a first example embodiment of the present disclosure.

FIG. 1 illustrates a display apparatus according to an embodiment of the present disclosure. FIGS. 2A to 2C illustrate a display apparatus according to an embodiment of the present disclosure.

As illustrated in FIGS. 1 and 2A, a display apparatus 1000 may include a display panel 100 configured to display an image and a supporting member 300 at a rear surface of the display panel 100. Also, a sound generator 200 may be at the rear surface of the display panel 100. A front surface of the display panel 100 may be defined as the surface of the display panel 100 from which the display panel emits light or displays an image by a pixel array. Correspondingly, a rear surface of the display panel 100 may be defined as the surface of the display panel 100 opposite to the front surface, in other words, a back side of the display panel 100.

As described below, the display panel 100 may be a light emitting display panel or a flexible light emitting display panel.

The display panel 100 according to an example embodiment may include a pixel array substrate including a pixel array with a plurality of pixels, an encapsulation layer which encapsulates the pixel array, and a polarization film which is attached to an upper portion of the encapsulation layer.

The plurality of pixels may be respectively provided in a plurality of pixel areas, that may be defined by a plurality of pixel driving lines. Also, each of the plurality of pixels may include a pixel circuit, including at least two thin film transistors (TFTs) and at least one capacitor, and a light emitting device which emits light with a current supplied from the pixel circuit. For example, the light emitting device may include an organic light emitting layer or a quantum dot light emitting layer. As another example, the light emitting device may include a micro light emitting diode (LED).

The encapsulation layer may protect the TFTs and the light emitting device from an external impact and may prevent moisture or oxygen from penetrating into the light emitting device.

The polarization film may be attached to an upper portion of the encapsulation layer by a film attach member. The polarization film may circularly polarize external light reflected by the TFTs and/or the pixel driving lines provided on the pixel array substrate, thereby enhancing the visibility and contrast ratio of the display panel 100.

Moreover, the display panel 100 may further include a barrier layer and a touch electrode layer between the encapsulation layer and the polarization film. Also, the display panel 100 may further include a color filter layer on an upper portion of the encapsulation layer.

Alternatively, the encapsulation layer may be replaced or supplemented with an encapsulation substrate which is attached to the pixel array substrate by a filler surrounding the pixel array. In a case where the filler is a transparent filler, the encapsulation substrate may be a transparent encapsulation substrate.

A driving circuit unit may be connected to a pad part provided on the pixel array substrate of the display panel 100, and may supply a driving signal and a data signal to the pixel driving lines to allow each of the pixels to display an image.

Alternatively, the display panel 100 may be a liquid crystal display panel. This will be described below.

The display panel 100 may include a first substrate, a second substrate, and a liquid crystal layer between the first and second substrates. The first substrate may include a pixel electrode or a common electrode for controlling alignment of liquid crystal molecules of the liquid crystal layer, and may include a TFT connected to the pixel electrode. The second substrate may include the color filter layer to provide for a display of a color image.

The display panel 100 may drive the liquid crystal layer with an electric field generated from a data voltage and a common voltage which are applied to each of the pixels to control light transmittance of the liquid crystal layer to display an image. The liquid crystal layer may be driven in various driving modes, such as a twisted nematic (TN) mode, a vertical alignment (VA) mode, an in-plane switching (IPS) mode, and a fringe field switching (FFS) mode.

For example, the first substrate may be a TFT substrate, and may include the plurality of pixels defined by a plurality of gate lines and a plurality of data lines which intersect one another. Each of the pixels may include a TFT connected to a corresponding gate line and a corresponding data line, a pixel electrode connected to the TFT, and a common electrode which is disposed adjacent to the pixel electrode and is supplied with the common voltage. The common electrode may be provided on the second substrate, based on a driving mode of the liquid crystal layer. A driving circuit unit for driving the display panel 100 and the pad part connected to the driving circuit unit may be disposed on one side of the first substrate. The second substrate may be a color filter array substrate and may include the color filter layer. In a case where the display panel 100 is driven in a color filter on TFT (COT) mode or a TFT on color filter (TOC) mode, the color filter layer may be provided on the first substrate.

A backlight unit may be under the display panel 100 and may irradiate light onto the display panel 100. The display panel 100 may control transmittance of the light emitted from the backlight unit to display an image.

The display apparatus 1000 may be a display module which includes the display panel 100 and the driving circuit unit for driving the display panel 100. For example, the driving circuit unit may include an integrated circuit (IC) chip and/or a flexible printed circuit board (FPCB). The driving circuit unit, such as a driving IC, for applying a voltage may be mounted on the FPCB. Alternatively, the driving circuit unit may be implemented in a different type, such as a chip-on-film (COF) type.

The gate lines and the data lines of the display panel 100 may be connected to the FPCB. When an electrical signal is applied from the FPCB, the electrical signal may be applied to a source electrode and a drain electrode of the TFT. The FPCB may receive an image signal from the outside of the display panel 100 to apply driving signals to the gate lines and the data lines of the display panel 100.

The FPCB may generate a gate signal and a data signal for driving the display panel 100, and a plurality of timing signals which allow the gate signal and the data signal to be applied at an appropriate time. The FPCB may apply the gate signal and the data signal to the gate lines and the data lines of the display panel 100. Also, the FPCB may include an amplifier.

A cover window may be provided on the display module. The cover window may be attached on a whole surface of the display module or a whole surface of the polarization film.

Moreover, the supporting member 300 may be a plate member which is provided on the rear surface or a whole surface of the display panel 100. For example, the supporting member 300 may face the rear surface of the display panel 100.

As an example, the supporting member 300 may be referred to as a cover bottom, a plate bottom, a back cover, a base frame, a metal frame, a metal chassis, a chassis base, or an m-chassis. Thus, the supporting member 300 may include all types of frames or plate structures on a rear surface of the display apparatus 1000.

The sound generator 200 may include a piezoelectric sound generator. The sound generator may be referred to as an actuator, an exciter, or a transducer, but embodiments are not limited to those terms.

When the sound generator 200 is configured with a piezoelectric sound generator, a display apparatus having a smaller thickness than that of a magnetic type speaker may be manufactured. The magnetic type speaker may include, for example, a magnet and a center pole on a plate, a bobbin near the center pole, and a coil wound around the bobbin.

The inventors have recognized that, where a piezoelectric sound generator is attached to a whole surface of a display panel, a whole area of the piezoelectric sound generator is fixed. For this reason, it is difficult to reproduce sound having a low-pitched sound band. Therefore, the inventors have recognized the occurrence of a problem where a frequency band tends toward a high-pitched sound band.

Therefore, the inventors have performed various experiments for outputting sound having the low-pitched sound band. Thus, inventors have invented a display apparatus including a sound generator having a new structure, which outputs sound having the low-pitched sound band. This will be described below with reference to FIGS. 2A to 2D and 3A to 3D.

FIG. 2A is a cross-sectional view taken along line I-I' of FIG. 1 and illustrates a display apparatus according to a first embodiment of the present disclosure.

As shown in FIG. 2A, a supporting member 300 and a sound generator 200 may be on a rear surface of a display panel 100. Also, the sound generator 200 may be between the display panel 100 and the supporting member 300. Also, at least one vibration generation members 501 may be between the display panel 100 and the sound generator 200.

The at least one vibration generation member 501 may be between the display panel 100 and the sound generator 200 so that the sound generator 200 is not attached to a whole surface of the display panel 100. Therefore, a contact area between the sound generator 200 and the display panel 100 does not become a whole surface area or an entire rear surface area of the display panel 100. Thus, a sound output from the sound generator 200 may not tend toward the high-pitched sound band.

The vibration generation member 501 may help the sound generator 200 generate sound having the low-pitched sound band. For example, the vibration generation member 501 may lower a frequency band to allow sound having the low-pitched sound band to be output. Also, the vibration generation member 501 may be formed of a soft material. The soft material may be, for example, a rubber-based material or a cushion material. For example, the rubber-based material may be silicon or urethane, but embodiments are not limited thereto.

The vibration generation member 501 may act as a spring and may assign flux to a vibration of the sound generator 200 to lower a resonance frequency. Therefore, the vibration generation member 501 may be a suspension, a damper, a spider, or an edge, but embodiments are not limited to the terms.

By forming the vibration generation member 501 with a soft material, the resonance frequency may be lowered. This will be described below with reference to FIG. 1.

A resonance frequency "fo" of a sound wave generated by a vibration of the sound generator may be determined as expressed in the following Equation (1), where "s" denotes a stiffness of a damper of a sound generator, and "m" denotes a mass:

$$f_0 = \frac{1}{2\pi} \times \sqrt{\frac{S}{m}} \qquad \text{(Equation 1)}$$

By forming the vibration generation member 501 with a soft material, the stiffness of the damper of the sound generator may be reduced. As a result, based on Equation (1), the resonance frequency may be reduced, thereby enhancing a sound characteristic corresponding to a low-pitched sound band.

Therefore, in the display apparatus according to an example embodiment of the present disclosure, sound having a low-pitched sound band may be output by using the vibration generation member 501. Thus, the sound generator 200 may output sound having the low-pitched sound band, whereby the sound generator 200 may output a broader range of sound, including sound having the high-pitched sound band and sound having the low-pitched sound band.

The vibration generation member 501 may be in a periphery of the display panel 100. Also, the vibration generation member 501 may be in a periphery of the sound generator 200. In other words, the vibration generation member 501 may be arranged at an edge portion or a peripheral portion of the sound generator 200. For example, the at least one vibration generation member 501 may be arranged at an edge portion or a periphery portion of a surface, e.g., the front surface, of the sound generator 200.

A sound generation method of the sound generator 200 according to an example embodiment will be described below with reference to FIG. 4.

FIG. 2B illustrates a top view according to a first embodiment of the present disclosure. FIG. 2B is a top view as seen from above (or from the front of the display apparatus 1000) in a state where the display panel 100 is removed. As illustrated in FIG. 2B, the vibration generation member 501 may be in a periphery of the sound generator 200. Also, the sound generator 200 may be between adjacent vibration generation members 501. In other words, the vibration generation member 501 may be arranged at an edge portion or a peripheral portion of the sound generator 200. For example, the at least one vibration generation member 501 may be arranged at an edge portion or a periphery portion of a surface, e.g., the front surface, of the sound generator 200.

FIG. 2C illustrates a bottom view according to a first embodiment of the present disclosure. FIG. 2C illustrates a bottom view as seen from above (or from the rear of the display apparatus 1000) in a state where the supporting member 300 is removed. As illustrated in FIG. 2C, the sound generator 200 may be on a whole surface or an entire rear surface of the display panel 100.

Figure 2D:
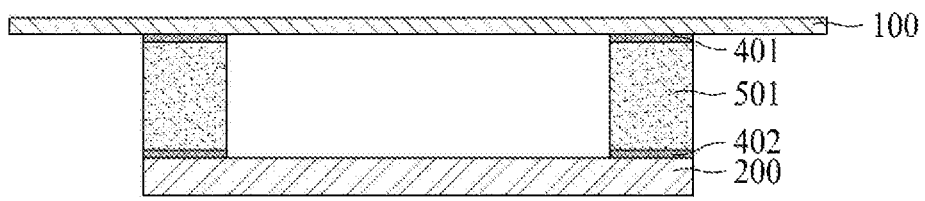
FIG. 2D illustrates the display apparatus according to a first example embodiment of the present disclosure.
Figure 2D:
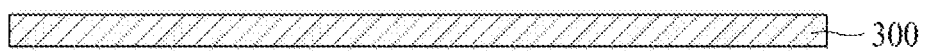

FIG. 2D illustrates a display apparatus according to a first embodiment of the present disclosure. As shown in FIG. 2D, the vibration generation member 501 may be attached to the display panel 100 by a first adhesive member 401. The first adhesive member 401 may be attached to a contact surface between the vibration generation member 501 and the display panel 100. This may address a potential problem of an adhesive member being attached to an undesired portion or the material cost of the adhesive member increasing. However, the embodiments are not limited thereto, and the first adhesive member 401 may be attached to a whole area or an entire rear surface area of the display panel 100, or a portion thereof. Also, the first adhesive member 401 may be, for example, a double-sided tape, a single-sided tape, an adhesive, or a bond, but embodiments are not limited thereto.

Moreover, the vibration generation member 501 may be attached to the sound generator 200 by a second adhesive member 402. The second adhesive member 402 may be attached to a contact surface between the vibration generation member 501 and the sound generator 200. This may also address a potential problem of an adhesive member being attached to an undesired portion or the material cost of the adhesive member increasing. However, the embodiments are not limited thereto, and the second adhesive member 402 may be attached to a whole area or an entire surface area of the sound generator 200, or a portion thereof. Also, the second adhesive member 402 may be, for example, a double-sided tape, a single-sided tape, an adhesive, or a bond, but embodiments are not limited thereto.

As described above with reference to FIGS. 2A to 2D, because a vibration generation member 501 may be between a display panel 100 and a sound generator 200, a configuration for generating sound having the low-pitched sound band may be implemented. Therefore, the inventors have recognized that a vibration generated by the sound generator 200 is offset by the vibration generation member 501, and that this may cause deterioration of a high-pitched sound. Also, the inventors have recognized that, due to a space between the display panel 100 and the sound generator 200 where no vibration generation member is provided, sound quality may be degraded by a standing wave. Therefore, the inventors have performed various experiments for improving the quality of a low-pitched sound, and reducing or preventing deterioration of a high-pitched sound. Thus, the inventors have developed a display apparatus including a sound generator having a new structure, which may improve the quality of a low-pitched sound and of a high-pitched sound. This will be described below with reference to FIGS. 3A to 3D.

Figure 3A:
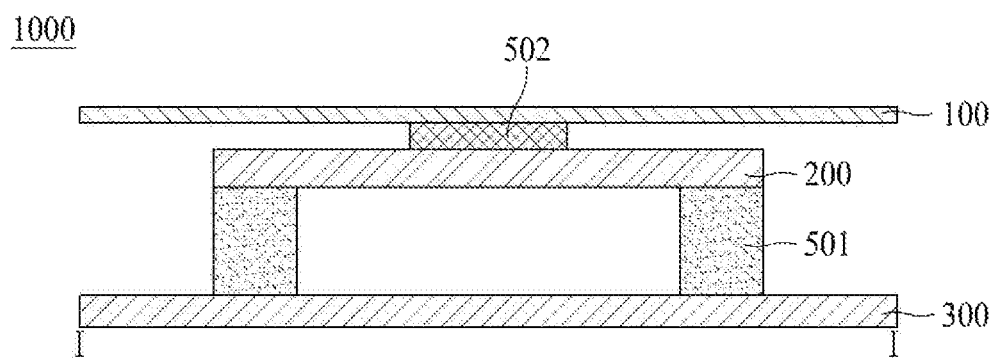
FIG. 3A is a cross-sectional view taken along line I-I' of FIG. 1 and illustrates a display apparatus according to a second example embodiment of the present disclosure.

FIG. 3A is a cross-sectional view taken along line I-I' of FIG. 1 and illustrates a display apparatus according to a second embodiment of the present disclosure.

As shown in FIG. 3A, a supporting member 300 and a sound generator 200 may be on a rear surface of a display panel 100. The sound generator 200 may be between the display panel 100 and the supporting member 300. Also, at least one vibration generation member may be between the display panel 100 and the sound generator 200. The at least one vibration member may include a vibration generation member 501 and a vibration transfer member 502.

The vibration transfer member 502 may be between the display panel 100 and the sound generator 200 without creating a large void between the sound generator 200 and the display panel 100. Therefore, the size of the void between the sound generator 200 and the display panel 100 may be reduced. Also, a fixed area between the sound generator 200 and the display panel 100 may be reduced, thereby enhancing a transfer force for transferring a high-pitched sound, generated by the sound generator 200, to the display panel 100. Moreover, by forming the vibration transfer member 502 with a soft material, a vibration associated with the high-pitched sound band of the sound generator 200 may be better transferred to the display panel 100, thereby reducing or preventing deterioration of the quality of a high-pitched sound. This may further improve the overall quality of the output sound, as well as the quality of a sound having the high-pitched sound band.

In addition, the vibration generation member 501 may be between the sound generator 200 and the supporting member 300. The vibration generation member 501 may help the sound generator 200 generate a sound having the low-pitched sound band. For example, the vibration generation member 501 may lower a frequency band to allow a sound having the low-pitched sound band to be output. Also, the vibration generation member 501 may be provided on the supporting member 300, thereby reducing a possible distortion of sound.

The vibration generation member 501 may function as a spring and may apply flux to a vibration of the sound generator 200 to lower the resonance frequency. Therefore, the vibration generation member 501 may be a suspension, a damper, a spider, or an edge, but embodiments are not limited thereto.

Moreover, the vibration generation member 501 may be formed of a soft material. The soft material may be, for example, a rubber-based material or a cushion material. For example, the rubber-based material may be silicon or urethane, but embodiments are not limited thereto.

If the vibration generation member 501 is formed of a soft material, the resonance frequency may be lowered. This is substantially the same as description given above with reference to FIGS. 2A to 2D. Thus, a detailed description is not repeated.

The vibration generation member 501 may be on the supporting member 300, and a position of the sound generator 200 may be fixed. Therefore, the vibration generation member 501 may perform an alignment function during a process of assembling or attaching the display panel 100 to the supporting member 300. The, the assembly process is improved, whereby a manufacturing process may be more efficiently and/or more accurately performed. Also, the vibration generation member 501 may reduce or prevent lateral or left-right twisting when generating a low frequency vibration, thereby reducing distortion of sound. In other words, the at least one vibration generation member 501 may be arranged between the sound generator 200 and the supporting member 300, and the at least one vibration transfer member 502 may be arranged between the display panel 100 and the sound generator 200. The sound generator 200 may be arranged between the display panel 100 and the supporting member 300, at a rear portion of the display panel 100.

The vibration generation member 501 may be in a periphery of the display panel 100. Also, the vibration generation member 501 may be in a periphery of the sound generator 200. In other words, the vibration generation member 501 may be arranged at an edge portion or a peripheral portion of the sound generator 200. For example, the at least one vibration generation member 501 may be arranged at an edge portion or a periphery portion of a surface, e.g., the rear surface, of the sound generator 200.

The vibration generation member 501 may be attached to the sound generator 200 by an adhesive member. For example, the adhesive member may be a double-sided tape, a single-sided tape, an adhesive, or a bond, but embodiments are not limited thereto.

Moreover, the vibration generation member 501 may be attached to the supporting member 300 by an adhesive member. For example, the adhesive member may be a double-sided tape, a single-sided tape, an adhesive, or a bond, but embodiments are not limited thereto.

The vibration generation member 501 may be formed of a material which differs from that of the vibration transfer member 502. For example, the vibration generation member 501 may be formed of a hard material which differs from a material of the vibration transfer member 502. The hard material may be, for example, one of metal, plastic, and a carbon fiber, but embodiments are not limited thereto. Also, the vibration transfer member 502 may include, for example without limitation, a rubber-based material or a cushion material. For example, the rubber-based material may be silicon or urethane, but embodiments are not limited thereto.

Therefore, the vibration transfer member 502 and the vibration generation member 501 including different materials may be respectively on an upper portion and a lower portion of the sound generator 200, or on a front surface and a rear surface of the sound generator 200. As a result, a sound reproduction band may be expanded and may include the low-pitched sound band to the high-pitched sound band, thereby reducing or preventing distortion of sound to enhance sound output quality. Also, the vibration generation member 501 may perform an alignment function, thereby improving the efficiency and/or accuracy of a process of assembling or attaching the display panel 100 to the supporting member 300. A front surface of the sound generator 200 may generally be defined as the surface of the sound generator 200 facing the rear surface of the display panel 100, and a rear surface of the sound generator 200 may generally be defined as the surface of the sound generator 200 facing the supporting member 300.

A sound generation method of the sound generator 200 according to an example embodiment will be described below with reference to FIG. 4.

Figure 3B:
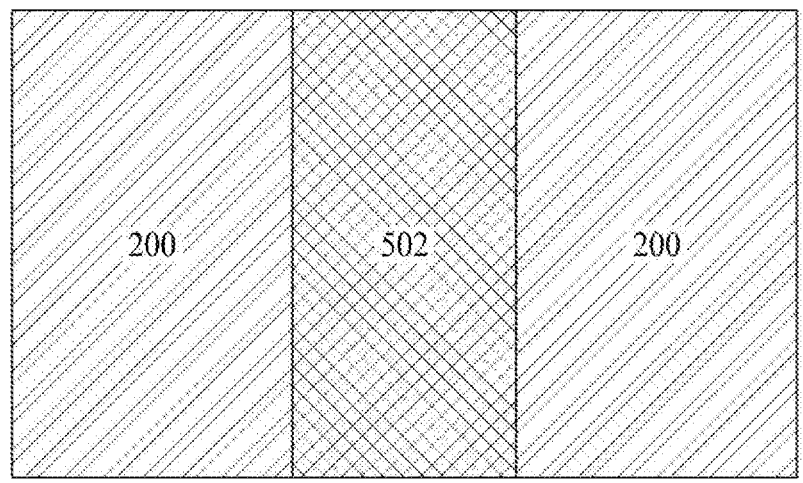
FIG. 3B illustrates a top view according to a second example embodiment of the present disclosure.

FIG. 3B illustrates a top view according to a second embodiment of the present disclosure. FIG. 3B illustrates a top view as seen from above (or from the front of the display apparatus 1000) in a state where the display panel 100 is removed. As shown in FIG. 3B, the vibration transfer member 502 may be in a center of the sound generator 200. Also, the vibration transfer member 502 may be between adjacent sound generators 200.

Figure 3C:
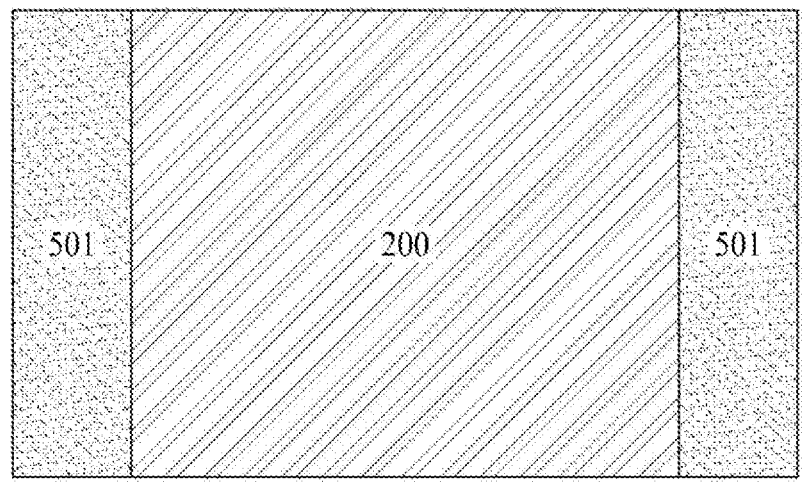
FIG. 3C illustrates a bottom view according to a second example embodiment of the present disclosure.

FIG. 3C illustrates a bottom view according to a second embodiment of the present disclosure. FIG. 3C illustrates a bottom view as seen from above (or from the rear of the display apparatus 1000) in a state where the supporting member 300 is removed. As shown in FIG. 3C, the vibration generation member 501 may be in a periphery of the sound generator 200. In other words, the vibration generation member 501 may be arranged at an edge portion or a peripheral portion of a surface of the sound generator 200. For example, the at least one vibration generation member 501 may be arranged at an edge portion or a periphery portion of a surface, e.g., the rear surface, of the sound generator 200. Also, the sound generator 200 may be between adjacent vibration generation members 501.

Figure 3D:
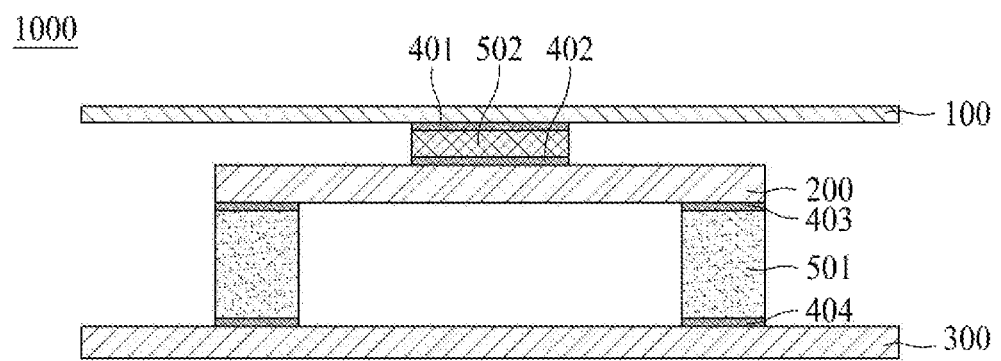
FIG. 3D illustrates a display apparatus according to a second example embodiment of the present disclosure.

FIG. 3D illustrates a display apparatus according to a second embodiment of the present disclosure. As shown in FIG. 3D, the vibration transfer member 502 may be attached to the display panel 100 by a first adhesive member 401. The first adhesive member 401 may be attached to a contact surface between the vibration transfer member 502 and the display panel 100. This may address a potential problem of an adhesive member being attached to an undesired portion or the material cost of the adhesive member increasing. However, embodiments are not limited thereto, and the first adhesive member 401 may be attached to a whole area or an entire rear surface area of the display panel 100, or a portion thereof. Also, the first adhesive member 401 may be, for example, a double-sided tape, a single-sided tape, an adhesive, or a bond, but embodiments are not limited thereto.

Moreover, the vibration transfer member 502 may be attached to the sound generator 200 by a second adhesive member 402. The second adhesive member 402 may be attached to a contact surface between the vibration transfer member 502 and the sound generator 200. This also may address a potential problem of an adhesive member being attached to an undesired portion or the material cost of the adhesive member increasing. However, embodiments are not limited thereto, and the second adhesive member 402 may be attached to a whole area or an entire front surface area of the sound generator 200, or a portion thereof. Also, the second adhesive member 402 may be, for example, a double-sided tape, a single-sided tape, an adhesive, or a bond, but embodiments are not limited thereto.

The vibration generation member 501 may be attached to the sound generator 200 by a third adhesive member 403. The third adhesive member 403 may be attached to a contact surface between the vibration generation member 501 and the sound generator 200. This may address a potential problem of an adhesive member being attached to an undesired portion or the material cost of the adhesive member increasing. However, embodiments are not limited thereto, and the third adhesive member 403 may be attached to a whole area or an entire rear surface area of the sound generator 200, or a portion thereof. Also, the third adhesive member 403 may be, for example, a double-sided tape, a single-sided tape, an adhesive, or a bond, but embodiments are not limited thereto.

Moreover, the vibration generation member 501 may be attached to the supporting member 300 by a fourth adhesive member 404. The fourth adhesive member 404 may be attached to a contact surface between the vibration generation member 501 and the supporting member 300. This also may address a potential problem of an adhesive member being attached to an undesired portion or the material cost of the adhesive member increasing. However, embodiments are not limited thereto, and the fourth adhesive member 404 may be attached to a whole area or an entire front surface area of the supporting member 300. Also, the fourth adhesive member 404 may be, for example, a double-sided tape, a single-sided tape, an adhesive, or a bond, but embodiments are not limited thereto.

Figure 4A:
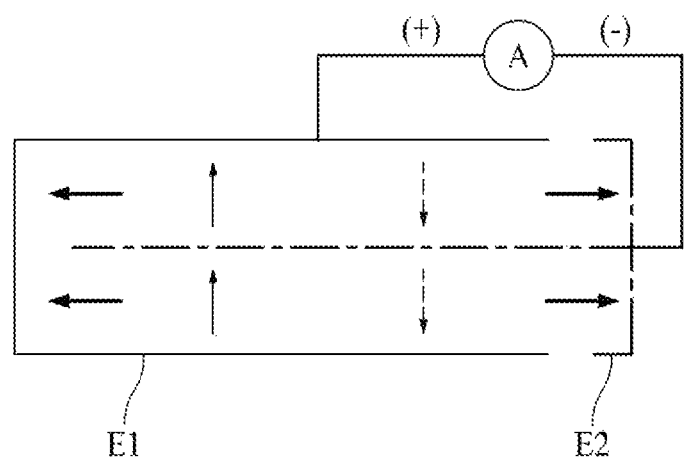
FIGS. 4A and 4B illustrate a sound generation method of a sound generator according to an example embodiment of the present disclosure.
Figure 4B:
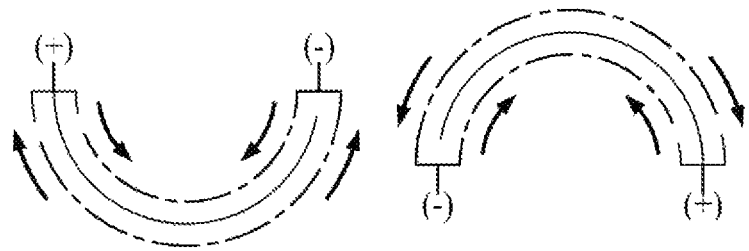

FIGS. 4A and 4B illustrate a sound generation method of a sound generator according to an example embodiment of the present disclosure.

A piezoelectric element may be an element having properties (i.e., a piezoelectric effect) where electrical polarization occurs based on an external force to cause a potential difference. When a voltage is applied, deformation or stress may occur. According to an example embodiment, the piezoelectric element may be formed of crystal, tourmaline, Rochelle salt, barium titanate ($BaTiO_3$), monoammonium phosphate ($NH_4H_2PO_4$), piezo ceramic, and/or the like.

Moreover, the piezoelectric element may be formed by sintering a material having a piezoelectric effect. The piezoelectric element may be formed of an insulation elastic material, such as silicon, acryl, or urethane, or a piezoelectric polymer material, such as poly vinylidene fluoride (PVDF) or PZT (lead zirconate titanate; a generic name for zirconate $PbZrO_3$ and titanate $PbTiO_3$). PVDF may include polyvinylidene fluoride trifluoroethylene (PVDF-TrFE) and may have a characteristic of being relatively easy to manufacture in a flexible film form.

Therefore, the piezoelectric element may have a structure where the piezoelectric element including an electrode may be attached to both surfaces of a metal vibration plate or a polymer by using an adhesive. A shape of the piezoelectric element may be deformed by applying an alternating current (AC) voltage to both surfaces of the piezoelectric element, and sound may be generated by transferring the shape deformation of the piezoelectric element to a vibration plate.

A piezoelectric speaker using the piezoelectric element may be categorized into a film type piezoelectric speaker and a stacked type piezoelectric speaker. The film type piezoelectric speaker uses the principle where an electrode is formed of a piezoelectric film material in each of an upper portion and a lower portion, and sound may be generated by applying a voltage.

The stacked type piezoelectric speaker may incorporate a plurality of layers including a piezoelectric element between two electrodes. An AC voltage may be applied between the two electrodes, and the stacked type piezoelectric speaker may be bent upward and downward according to the AC voltage. The piezoelectric element may use the above-described materials, but embodiments are not limited thereto. Here, an example where a second sound generator is configured with the staked type piezoelectric speaker is described, but embodiments of the present disclosure are not limited thereto. In other embodiments, the film type piezoelectric speaker may also be incorporated. This will be described below with reference to FIGS. 4A and 4B.

FIG. 4A illustrates a side structure of a sound generator according to an example embodiment of the present disclosure.

As shown in FIG. 4A, a positive (+) voltage and a negative (−) voltage are respectively applied to a first electrode E1 and a second electrode E2. When a voltage having a direction opposite to a polarization direction (illustrated as a thin solid line in an upward direction) is applied, a stress may be generated based on a piezoelectric effect, and deformation based on contraction or expansion in a displacement direction (illustrated as a thick solid line in a lateral direction) may occur. Therefore, as illustrated in FIG. 4B, deformation caused by an AC voltage may occur in a piezoelectric type sound generator, and the piezoelectric type sound generator may be changed to a vertical motion mode or an up-and-down motion mode, or may be bent in a displacement direction (illustrated as a thick solid line). A vibration may be generated based on the vertical motion mode or the up-and-down motion mode, and sound may be generated based on the vibration.

Figure 5:
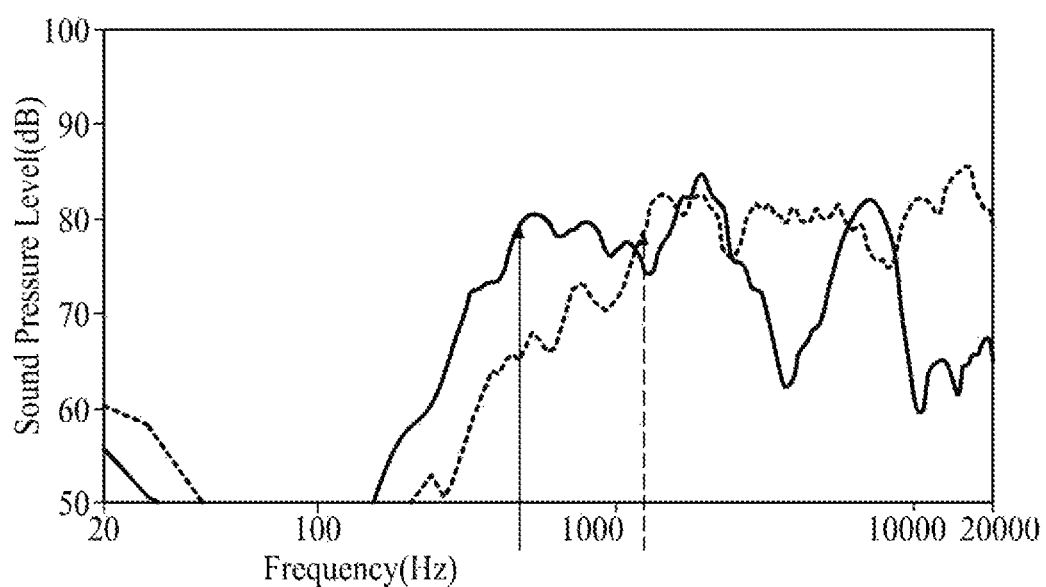
FIG. 5 illustrates a sound output characteristic according to an example embodiment of the present disclosure.

FIG. 5 illustrates a sound output characteristic according to a first embodiment of the present disclosure. In FIG. 5, the abscissa axis (x-axis) represents a frequency in hertz (Hz) and the ordinate axis (y-axis) represents a sound pressure level in decibels (dB).

A sound output characteristic may be measured by a sound analysis apparatus. The sound analysis apparatus may include a sound card to transmit or receive a sound to or from a control personal computer (PC), an amplifier to amplify a signal generated from the sound card and to transfer the amplified signal to a sound generator, and a microphone to collect a sound generated by the sound generator in a display panel. The sound collected through the microphone may be input to the control PC through the sound card, and a control program may be employed to check the input sound to analyze the sound of the sound generator.

In FIG. 5, the dotted line shows an example where a sound generator is provided in a display panel. The solid line shows an example where a sound generator and a vibration generation member are provided in the display panel, for example, as described above with reference to FIGS. 2A to 2C.

As shown as a dotted line of FIG. 5, if a piezoelectric sound generator is provided in a display panel, it can be seen that a sound pressure level increases at or around a frequency of 1,400 Hz (shown as a dotted-line arrow). Also, as shown as a solid line of FIG. 5, if a vibration transfer member and a piezoelectric sound generator are provided in a display panel, it can be seen that a sound pressure level increases at or around a frequency of 500 Hz (shown as a solid-line arrow). Accordingly, with a configuration in which a sound generator and a vibration transfer member are provided, a low-pitched sound may be enhanced by about twice or more in comparison with a configuration where only a sound generator is provided.

Figure 6A:
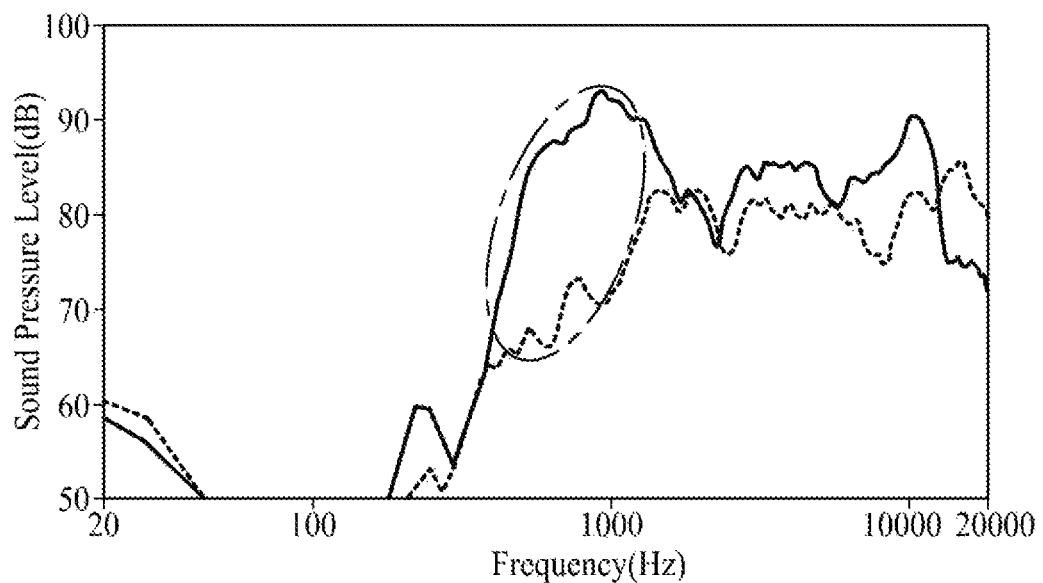
FIGS. 6A and 6B illustrate a sound output characteristic according to an example embodiment of the present disclosure.
Figure 6B:
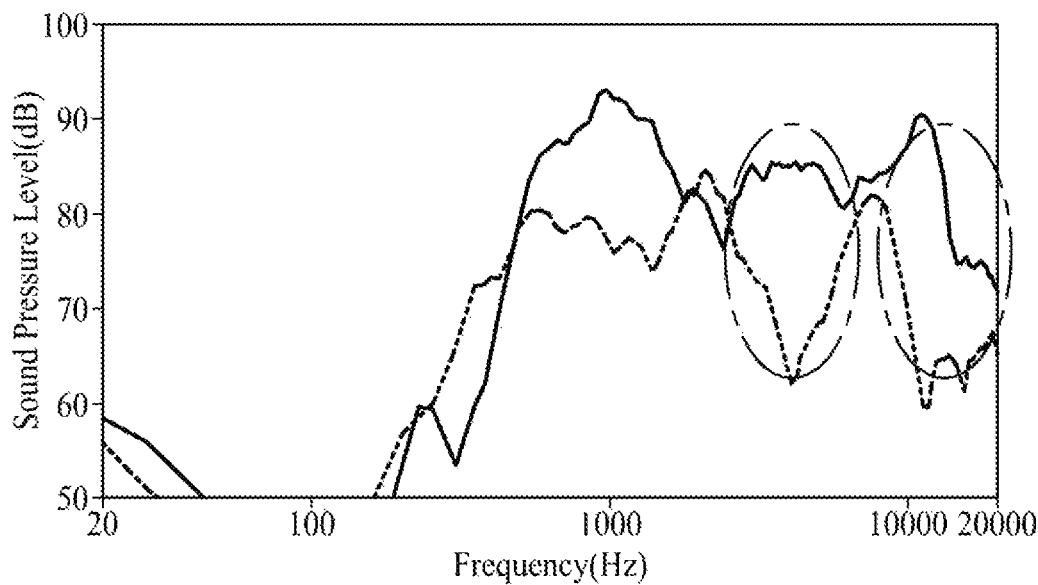

FIGS. 6A and 6B illustrate a sound output characteristic according to the second embodiment of the present disclosure. In FIGS. 6A and 6B, the abscissa axis (x-axis) represents a frequency in hertz (Hz), and the ordinate axis (y-axis) represents a sound pressure level in decibels (dB).

In FIG. 6A, a dotted line shows an example where a sound generator is provided in a display panel, and a solid line shows an example where a sound generator, a vibration generation member, and a vibration transfer member are provided in the display panel, as described above with reference to FIGS. 3A to 3C.

As illustrated in FIG. 6A, a sound pressure level may be enhanced in a frequency domain (shown in the dashed dotted circle) of 3 kHZ or less of a middle-to-low-pitched sound band. Accordingly, employing the vibration generation member may enhance sound having the low-pitched sound band.

In FIG. 6B, the dotted line shows an example where a sound generator and a vibration generation member are provided in the display panel, as described above with reference to FIGS. 2A to 2C. The solid line shows an example where a sound generator, a vibration generation member, and a vibration transfer member are provided in the display panel, as described above with reference to FIGS. 3A to 3C.

As illustrated in FIG. 6B, if the vibration transfer member is additionally provided, output sound may be enhanced in a frequency domain (shown in dashed dotted circles) of 3 kHZ or higher of the high-pitched sound band.

Therefore, additionally employing the vibration generation member and the vibration transfer member may enhance sound in the low-pitched sound band and the high-pitched sound band, thereby providing a display apparatus capable of outputting sound with uniform sound quality in a wide range of frequency domain.

The sound generator according to an embodiment of the present disclosure may be applied as a sound generator provided in a display apparatus. The display apparatus according to an embodiment of the present disclosure may be applied, for example, to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display devices, televisions (TVs), notebook computers, monitors, cameras, camcorders, home appliances, etc. The display apparatus according to an embodiment of the present disclosure may include a sound generator smaller in size in a case where the display apparatus is incorporated in a mobile device. Also, the piezoelectric sound generator employed in a configuration according to an embodiment of the present disclosure may output uniform sound in a wide range of sound band from the low-pitched sound band to the high-pitched sound band.

A display apparatus according to an embodiment of the present disclosure will be described below.

A display apparatus according to an embodiment of the present disclosure includes a display panel configured to display an image, a supporting member on a rear surface of the display panel, a sound generator between the display panel and the supporting member, and at least one vibration member between the display panel and the supporting member.

According to some embodiments of the present disclosure, the at least one vibration member may include a vibration transfer member between the display panel and the sound generator.

According to some embodiments of the present disclosure, the vibration transfer member may be configured to transfer a vibration having a high-pitched sound band of the sound generator to the display panel.

According to some embodiments of the present disclosure, the vibration transfer member may be in a center of the sound generator.

According to some embodiments of the present disclosure, the display apparatus may further include an adhesive member attaching the vibration transfer member to the sound generator or the display panel.

According to some embodiments of the present disclosure, the at least one vibration member may include a vibration generation member between the display panel and the sound generator.

According to some embodiments of the present disclosure, the vibration generation member may be configured to generate sound having a low-pitched sound band of the sound generator.

According to some embodiments of the present disclosure, the vibration generation member may be in a periphery of the display panel.

According to some embodiments of the present disclosure, the display apparatus may further include an adhesive member attaching the vibration generation member to the sound generator or the display panel.

According to some embodiments of the present disclosure, the at least one vibration member may include a vibration transfer member between the display panel and the sound generator and a vibration generation member on an upper portion of the supporting member.

According to some embodiments of the present disclosure, the vibration transfer member may be in a center of the display panel, and the vibration generation member may be in a periphery of the display panel.

According to some embodiments of the present disclosure, the vibration transfer member may be configured to transfer a vibration having a high-pitched sound band of the sound generator to the display panel, and the vibration generation member may be configured to generate sound having a low-pitched sound band of the sound generator.

According to some embodiments of the present disclosure, the sound generator may include a piezoelectric sound generator.

A display apparatus according to an embodiment of the present disclosure includes a display panel configured to display an image, a supporting member and a sound generator on a rear surface of the display panel, at least one vibration generation member between the display panel and the supporting member, and at least one vibration transfer member between the display panel and the sound generator.

According to some embodiments of the present disclosure, the at least one vibration generation member may be between the display panel and the sound generator and in a periphery of the sound generator.

According to some embodiments of the present disclosure, the at least one vibration transfer member may be in a center of the sound generator.

According to some embodiments of the present disclosure, the at least one vibration generation member may be configured to generate sound having a low-pitched sound band of the sound generator.

According to some embodiments of the present disclosure, the at least one vibration transfer member may be configured to transfer a vibration having a high-pitched sound band of the sound generator to the display panel.

According to some embodiments of the present disclosure, the sound generator may include a piezoelectric sound generator.

A display apparatus according to an embodiment of the present disclosure includes a display panel configured to display an image, a supporting member on a rear surface of the display panel, a sound generator between the display panel and the supporting member, at least one vibration transfer member between the display panel and the sound generator, and at least one vibration generation member on an upper portion of the supporting member, the at least one vibration generation member including a material which differs from a material of the at least one vibration transfer member.

According to some embodiments of the present disclosure, the at least one vibration transfer member may include one of metal, plastic, and a carbon fiber, and the at least one vibration generation member may include a rubber-based material or a cushion material.

According to some embodiments of the present disclosure, the at least one vibration transfer member may be in a center of the sound generator, and the at least one vibration generation member may be in a periphery of the sound generator.

According to some embodiments of the present disclosure, the at least one vibration transfer member may be configured to transfer a vibration having a high-pitched sound band of the sound generator to the display panel, and the at least one vibration generation member may be configured to generate sound having a low-pitched sound band of the sound generator.

According to some embodiments of the present disclosure, the sound generator may include a piezoelectric sound generator.

As described above, according to embodiments of the present disclosure, a sound generator and a vibration member may be provided, thereby providing a display apparatus for outputting sound having a low-pitched sound band to a high-pitched sound band.

Moreover, in the display apparatus according to embodiments of the present disclosure, since a vibration generation member performs an alignment function, the efficiency and/or accuracy of a process of assembling or attaching a display panel to a supporting member may be enhanced.

Moreover, the display apparatus according to embodiments of the present disclosure may include a sound generator and a vibration member, thereby reducing or preventing a distortion of sound to enhance sound quality.

Moreover, the display apparatus according to embodiments of the present disclosure may include a sound generator and a vibration member, and thus may reduce or prevent the deterioration of a high-pitched sound, thereby expanding a sound reproduction band to enhance sound quality.

Moreover, according to embodiments of the present disclosure, a plurality of vibration members may be formed of different materials, thereby providing a display apparatus for outputting sound having a low-pitched sound band to a high-pitched sound band.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display apparatus, comprising:
a display panel configured to display an image;
a supporting member at a rear surface of the display panel;
a sound generator between the display panel and the supporting member; and
at least one vibration member between the display panel and the supporting member,
wherein the at least one vibration member comprises a vibration generation member between the display panel and the sound generator,
wherein the vibration generation member is in a periphery of the sound generator, and
wherein the vibration generation member is attached to the display panel and the sound generator.

2. The display apparatus of claim 1, wherein the vibration generation member is configured to vibrate the display panel to generate sound having a low-pitched sound band of the sound generator.

3. The display apparatus of claim 1, wherein the vibration generation member is in a periphery of the display panel.

4. The display apparatus of claim 1, further comprising an adhesive member attaching the vibration generation member to one or both of the sound generator and the display panel.

5. The display apparatus of claim 1, wherein the sound generator is configured to vibrate the display panel via the vibration generation member to generate sound.

6. The display apparatus of claim 1, wherein the sound generator comprises a piezoelectric sound generator.

7. A display apparatus, comprising:
a display panel configured to display an image;
a supporting member and a sound generator at a rear surface of the display panel; and
a vibration member including:
at least one vibration generation member between the display panel and the supporting member, the at least one vibration generation member being attached to a surface of the supporting member; and
at least one vibration transfer member between the display panel and the sound generator,
wherein the sound generator is attached to the at least one vibration transfer member and the at least one vibration generation member.

8. The display apparatus of claim 7, wherein the at least one vibration generation member is between the supporting member and the sound generator, and in a periphery of the sound generator.

9. The display apparatus of claim 8, wherein the at least one vibration transfer member is at a center of the sound generator.

10. The display apparatus of claim 7, wherein the at least one vibration generation member is configured to generate sound having a low-pitched sound band of the sound generator.

11. The display apparatus of claim 7, wherein the at least one vibration transfer member is configured to transfer a vibration having a high-pitched sound band of the sound generator to the display panel to generate sound.

12. The display apparatus of claim 7, wherein the sound generator comprises a piezoelectric sound generator, and
wherein the sound generator is configured to vibrate the display panel via the at least one vibration generation member or the at least one vibration transfer member to generate sound.

13. A display apparatus, comprising:
a display panel configured to display an image;
a supporting member at a rear surface of the display panel;
a sound generator between the display panel and the supporting member;
at least one vibration transfer member between the display panel and the sound generator; and
at least one vibration generation member attached to a surface of the supporting member facing the display panel, the at least one vibration generation member including a material different from a material of the at least one vibration transfer member,
wherein the at least one vibration transfer member is at a center of the sound generator,
wherein the at least one vibration generation member is in a periphery of the sound generator, and
wherein the sound generator is attached to the at least one vibration transfer member and the at least one vibration generation member.

14. The display apparatus of claim 13, wherein the at least one vibration transfer member comprises one of metal, plastic, and a carbon fiber, and the at least one vibration generation member comprises a rubber-based material or a cushion material.

15. The display apparatus of claim 13, wherein the at least one vibration transfer member is configured to transfer a vibration having a high-pitched sound band of the sound generator to the display panel to generate sound having the high-pitched sound band, and the at least one vibration generation member is configured to generate sound having a low-pitched sound band of the sound generator.

16. The display apparatus of claim 13, wherein the sound generator comprises a piezoelectric sound generator, and
wherein the sound generator is configured to vibrate the display panel via the at least one vibration generation member or the at least one vibration transfer member to generate sound.

* * * * *